(12) United States Patent
Li et al.

(10) Patent No.: US 9,889,818 B2
(45) Date of Patent: Feb. 13, 2018

(54) INFORMATION PROCESSING METHOD AND INFORMATION PROCESSING SYSTEM

(71) Applicant: LEAUTO INTELLIGENT TECHNOLOGY (BEIJING) CO.LTD, Beijing (CN)

(72) Inventors: Wenrui Li, Beijing (CN); Yong Xu, Beijing (CN); Yu Zou, Beijing (CN); Kunsheng Chen, Beijing (CN); Wei Lin, Beijing (CN); Peng Liu, Beijing (CN); Dan Li, Beijing (CN)

(73) Assignee: LEAUTO INTELLIGENT TECHNOLOGY (BEIJING) CO. LTD., Beijing (CN)

( * ) Notice: Subject to any disclaimer, the term of this patent is extended or adjusted under 35 U.S.C. 154(b) by 0 days.

(21) Appl. No.: 14/971,969

(22) Filed: Dec. 16, 2015

(65) Prior Publication Data
US 2017/0120866 A1    May 4, 2017

(30) Foreign Application Priority Data
Oct. 30, 2015 (CN) .......................... 2015 1 0728761

(51) Int. Cl.
*B60R 25/20* (2013.01)
*B60R 25/24* (2013.01)
(Continued)

(52) U.S. Cl.
CPC .......... *B60R 25/2036* (2013.01); *B60R 25/01* (2013.01); *B60R 25/23* (2013.01);
(Continued)

(58) Field of Classification Search
CPC ..... B60R 25/2036; B60R 25/01; B60R 25/23; B60R 25/24; E05F 15/60; E05F 15/73;
(Continued)

(56) References Cited

U.S. PATENT DOCUMENTS

| | | | |
|---|---|---|---|
| 6,856,239 B1 * | 2/2005 | Hicks | B60R 25/2036 296/155 |
| 7,504,931 B2 * | 3/2009 | Nguyen | B60R 25/102 340/426.15 |
| 8,668,145 B2 * | 3/2014 | Tessier | G06K 7/08 235/380 |
| 9,478,087 B2 * | 10/2016 | Proefke | G07C 9/00182 |
| 9,538,473 B2 * | 1/2017 | Nam | H04W 52/0238 |
| 9,760,753 B2 * | 9/2017 | Bechtel | G06K 9/0002 |
| 2009/0085720 A1 * | 4/2009 | Kurpinski | B60R 25/246 340/5.64 |
| 2009/0091477 A1 * | 4/2009 | Mc Call | G01S 19/42 340/990 |
| 2009/0138184 A1 * | 5/2009 | Terada | F02D 41/009 701/112 |
| 2009/0231094 A1 * | 9/2009 | Higgins | G07C 9/00309 340/5.64 |

(Continued)

*Primary Examiner* — Tuan C To

(57) ABSTRACT

The present disclosure provides an information processing method and an information processing system. The information processing method is used for controlling a vehicle door, which includes: detecting an action of a vehicle door controlled by an user and feedbacking the action to a processing module through a detecting module; transmitting a control command to a control module according to the detected action through the processing module; and performing the control command to select at least one vehicle door from all vehicle doors and operate the selected vehicle door through the control module. In the technique scheme of the present disclosure, the processing module transmits the control command to the control module according to the detected action; the control module performs the control command to select at least one vehicle door from all vehicle doors and operate the selected vehicle door, thereby increasing the convenience of operating the vehicle door.

18 Claims, 5 Drawing Sheets

(51) Int. Cl.
*B60R 25/01* (2013.01)
*B60R 25/23* (2013.01)
*G07C 9/00* (2006.01)
*E05F 15/60* (2015.01)
*E05F 15/73* (2015.01)

(52) U.S. Cl.
CPC .............. *B60R 25/24* (2013.01); *E05F 15/60* (2015.01); *E05F 15/73* (2015.01); *G07C 9/00158* (2013.01); *G07C 9/00174* (2013.01); *G07C 2009/00769* (2013.01); *G07C 2209/62* (2013.01)

(58) Field of Classification Search
CPC ............ G07C 9/00158; G07C 9/00174; G07C 2009/00769; G07C 2209/62
See application file for complete search history.

(56) References Cited

U.S. PATENT DOCUMENTS

| | | | | |
|---|---|---|---|---|
| 2014/0303852 | A1* | 10/2014 | Seki | E05F 15/2038 701/49 |
| 2015/0100203 | A1* | 4/2015 | Tai | B60Q 3/0293 701/36 |
| 2016/0140379 | A1* | 5/2016 | Pedersen | G06K 9/00919 726/19 |
| 2016/0264097 | A1* | 9/2016 | Oesterling | B60R 25/20 |
| 2016/0299596 | A1* | 10/2016 | den Boer | C03C 17/3671 |
| 2016/0357262 | A1* | 12/2016 | Ansari | G06F 3/017 |
| 2016/0369551 | A1* | 12/2016 | Suzuki | E05C 17/00 |
| 2017/0109952 | A1* | 4/2017 | Johnson | G07C 9/00309 |

* cited by examiner

INFORMATION PROCESSING METHOD AND INFORMATION PROCESSING SYSTEM

CROSS REFERENCE TO RELATED APPLICATION

This application claims priority under 35 U.S.C. § 119(a) to Patent Application No(s). 201510728761.3, filed in China on Oct. 30, 2015, the entire contents of which are hereby incorporated by reference.

FIELD OF TECHNOLOGY

The present disclosure is related to automation technology field, and more particular to an information processing method and an information processing system for automatically controlling a vehicle door.

BACKGROUND

In the vehicle field, people wish as simply and conveniently as possible to lock and unlock the door. Thus the application of the vehicle keyless entry system is widely applied. With the development of biometrics, especially in the development and the promotion of the fingerprint recognition technique, the application and the research of the technique are extended to the field of the vehicle door control.

In the process of achieving the prior art, the inventors have found the problems of the prior art at least as following.

Currently, the fingerprint recognition technique in the application of the door control field is limited to the achievement of the unlocking function. Namely, before the user starts to drive, the user needs using the fingerprint to unlock the vehicle door, and then the user opens the vehicle door to enter into the main cockpit. The user needs unlocking the door to open the door, thereby decreasing the convenience of operating the vehicle door. On the other hand, after completing the driving, and the user leaves the vehicle, the vehicle door is automatically locked after a predetermined time. However, the predetermined time may be tens of seconds, and may also be a few minutes. On the one hand, the predetermined time is long, thereby easily bringing the risk of vehicle theft. On the other hand, the predetermined time is short, the vehicle door has been locked before the user leaves the vehicle, and the user experience is poor.

SUMMARY

An embodiment of the present disclosure provides an information processing method, used for controlling a vehicle door, which includes:

detecting an action of a vehicle door controlled by an user and feedbacking the action to a processing module through a detecting module;

transmitting a control command to a control module according to the detected action through the processing module; and performing the control command to select at least one vehicle door from all vehicle doors and operate the selected vehicle door through the control module.

An embodiment of the present disclosure further provides an apparatus used for controlling a vehicle door, which includes:

a processor; and a memory containing a program, when executed by the processor, the processor executes the following steps:

detecting an action of a vehicle door controlled by an user and feedbacking the action to a processing module through a detecting module;

transmitting a control command to a control module according to the detected action through the processing module; and performing the control command to select at least one vehicle door from all vehicle doors and operate the selected vehicle door through the control module.

The information processing method and system provided by the embodiments of the present disclosure at least includes the following beneficial effects.

The processing module transmits a control command to a control module according to the detected action; the control module performs the control command to select at least one vehicle door from all vehicle doors and operate the selected vehicle door, thereby increasing the convenience for operating the vehicle door. The present disclosure not only achieves entering the vehicle without the key for the driver, but also enables the driver to remotely control the functions for opening or closing the other doors at the side of the door near himself/herself.

BRIEF DESCRIPTION OF THE DRAWING(S)

In order to illustrate the technical schemes of the prior art or the embodiments of the present disclosure more clearly, the accompanying drawings for illustrating the prior art or the embodiments of the present disclosure are briefly described as below. It is apparent that the drawings described below are merely some embodiments of the present disclosure and those skilled in the art may derive other drawings according the drawings described below without creative endeavor. The accompanying drawings described herein provide a further understanding of the present present disclosure, and constitute a part of this present disclosure. The exemplary embodiments of the present present disclosure and the explanation thereof are used to explain the present present disclosure, and do not constitute improper limitation on the present present disclosure. In the drawings:

DESCRIPTION OF THE EMBODIMENTS

For the purpose, technical solution, and advantage of the present disclosure becoming clearer, the specific embodiments of the present disclosure combined with the accompanying drawings are described clearly and completely as follows. Obviously, the described embodiments are only part of the embodiments of the present disclosure rather than all embodiments. Based on the embodiments of the present disclosure all other embodiments obtained by those having ordinary skills in this field without creative work are within the scope of protection of the present disclosure.

Figure 1:
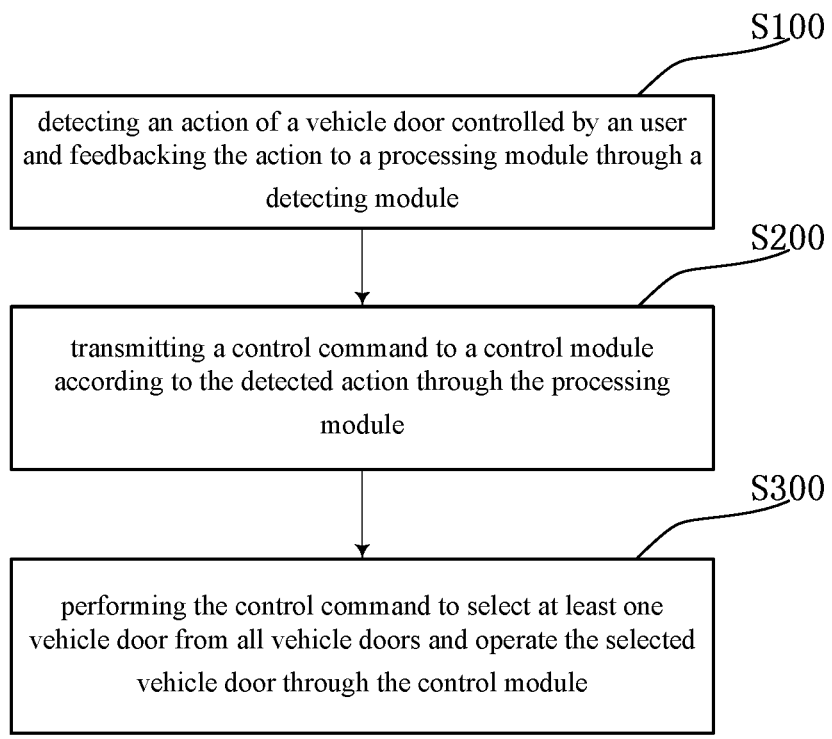
FIG. 1 is a flowchart of an information proceeding method according to one embodiment of the present disclosure.

FIG. 1 is a flowchart of an information proceeding method according to one embodiment of the present disclosure, which includes the following steps:

S100: detecting an action of a vehicle door controlled by an user and feedbacking the action to a processing module through a detecting module.

In one embodiment of the present disclosure, the detecting module includes a touch component equipped with a touch area. The step of detecting the action of the vehicle door controlled by the user and feedbacking the action to the processing module through the detecting module specifically includes the following step:

detecting a sliding trace of the user on the touch area through the touch component.

Figure 2:
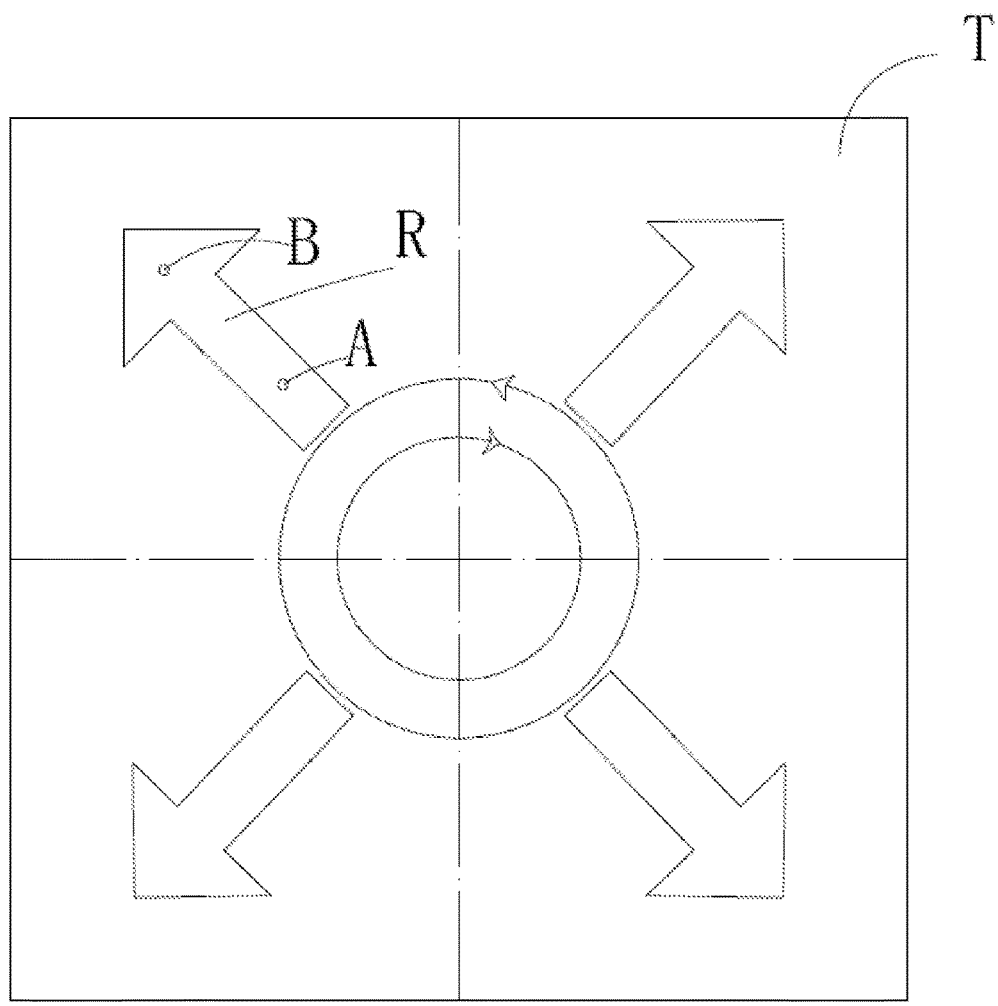
FIG. 2 is a schematic view of an action of the vehicle door controlled by the user according to a first embodiment of the present disclosure.

Further, refer to FIG. 2, in a still another embodiment of the present disclosure, the sliding trace is:

at a first time point, a combined position of the user and the touch area is in a first position;

at a second time point after the first time point, the combined position of the user and the touch area is in a second position;

at a time point between the first time point and the second time point, the combined position of the user and the touch area changes to form a path;

wherein, an angle from a tangential direction of the first position of the path to a tangential direction of the second position of the path is not greater than 90 degrees.

Thus, an extending direction of the path within a range not greater than 90 degrees may indicate the same action, thereby increasing the convenience of the operation for user.

Specifically, please refer to FIG. 2. At the first time point, the combined position of the user and the touch area T is in a position A. At the second time point after the first time point, the combined position of the user and the touch area T is in a position B. At the time point between the first time point and the second point, the combined position of the user and the touch area T changes to form the path R. The angle from a tangential direction of the position A of the path R to a tangential direction of the position B of the path R is not greater than 90 degrees.

Further, in a still another embodiment of the present disclosure, the sliding trace is:

at a first time point, a combined position of the user and the touch area is in a first position;

at a second time point after the first time point, the combined position of the user and the touch area is in a second position;

at a time point between the first time point and the second time point, the combined position of the user and touch area changes to form a path;

wherein, an angle from a tangential direction of the first position of the path to a tangential direction of the second position of the path is not less than 180 degrees.

Thus, an extending direction of the path located within a range not less than 180 degrees may indicate the same action, thereby increasing the convenience of the operation for user.

In one embodiment, the angle may be within a range greater than 270 degrees, thereby conveniently distinguish and achieve different functions.

Figure 3:
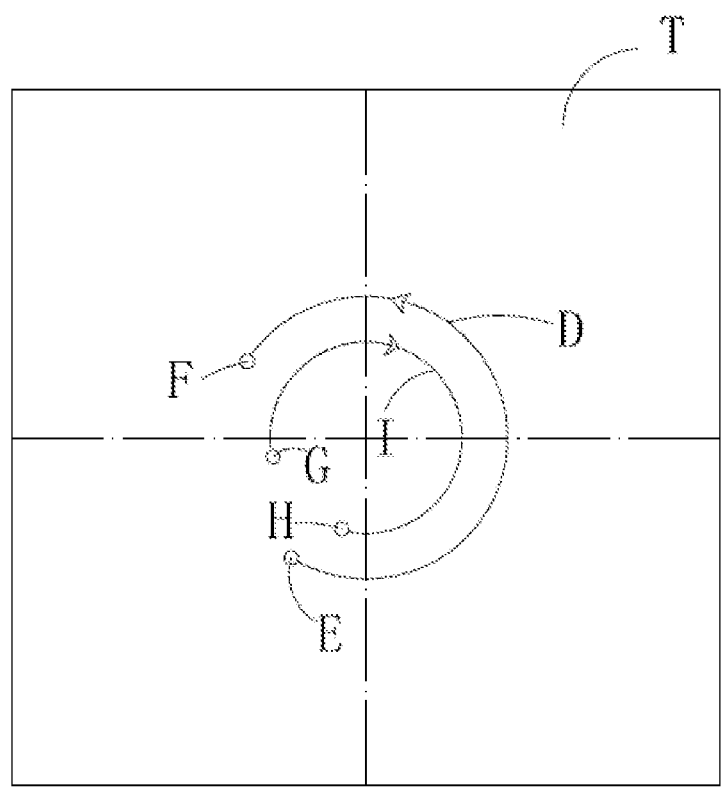
FIG. 3 is a schematic view of an action of the vehicle door controlled by the user according to a second embodiment of the present disclosure.

Specifically, please refer to FIG. 3. At the first time point, the combined position of the user and the touch area T is in a position E. At the second time point after the first time point, the combined position of the user and the touch area T is in a position F. At the time point between the first time point and the second point, the combined position of the user and the touch area T changes to form the path D. The angle from a tangential direction of the position E of the path D to a tangential direction of the position F of the path D is not less than 180 degrees. Or, at the first time point, the combined position of the user and the touch area T is in a position G. At the second time point after the first time point, the combined position of the user and the touch area T is in a position H. At the time point between the first time point and the second point, the combined position of the user and the touch area T changes to form the path I. The angle from a tangential direction of the position G of the path I to a tangential direction of the position H of the path I is not less than 180 degrees.

Further, in a still another embodiment of the present disclosure, the detecting module includes a touch component equipped with a touch area. The step of detecting the action of the vehicle door controlled by the user and feedbacking the action to the processing module through the detecting module specifically includes the following step:

detecting a press operation of the user on the touch area through the touch component.

Further, in a still another embodiment of the present disclosure, the press operation is:

a first position of the touch area is compressed by a pressure variation.

Further, in a still another embodiment of the present disclosure, the press operation is:

a first position, a second position and a third position of the touch area are compressed by a pressure variation;

wherein, a trace from the first position through the second position to the third position, relative to a center of the touch area, is distributed within a range not less than 180 degrees.

Herein, different from the sliding operation, the compression operations of the user on different positions may be divided into a plurality of actions corresponding to a plurality of control commands, so as to control different vehicle doors or other subsystems correspondingly, thereby increasing the convenience of the operation for the user.

Figure 4:
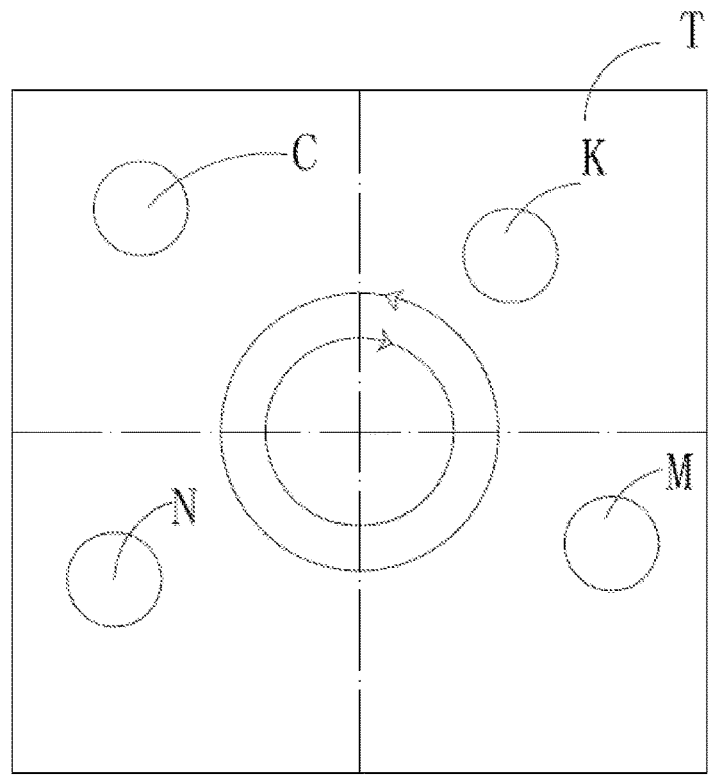
FIG. 4 is a schematic view of an action of the vehicle door controlled by the user according to a third embodiment of the present disclosure.

Specifically, refer to FIG. 4. The touch component detects that the position C of the touch area T is compressed by the pressure variation of the user. The touch area T may be divided into a first quadrant, a second quadrant, a third quadrant and the fourth quadrant according to a geometric relationship. Herein, the compression may be a compression in a fixed point, such as a position C, and may also be the compression among several quadrants in accordance with a certain order, such as a position C, a position K and a position M compressed in turn, or a position C, a position N and a position M compressed in turn.

Further, in a still another embodiment of the present disclosure, the detecting module includes a lens assembly.

The step of detecting the action of the vehicle door controlled by the user and feedbacking the action to the processing module through the detecting module includes the following steps:

detecting the action of the vehicle door controlled by the user and feedbacking the action to the processing module through the lens assembly.

The lens assembly can provide an alternative technique for detecting the action of the vehicle controlled by the user. When the technique is used separately, it may expand an adaptability of the information processing manner. When the lens assembly combined with the touch component is used, it may increase an accuracy of the action of the user.

Specifically, for example, the action of the user may be captured by a camera and feedback to a processing module.

S200: transmitting a control command to a control module according to the detected action through the processing module.

Please refer to FIG. 2. In a still another embodiment of the present disclosure, the step of transmitting a control command to a control module according to the detected action through the processing module includes the following step:

When the extending direction of the sliding trace is located between a 9 o'clock direction and a 0 o'clock direction of the touch area, or when the extending direction of the sliding trace is located between a 0 o'clock direction and a 3 o'clock direction of the touch area, or when the extending direction of the sliding trace is located between a 3 o'clock direction and a 6 o'clock direction of the touch area, or when the extending direction of the sliding trace is located between a 6 o'clock direction and a 9 o'clock direction of the touch area, the processing module transmits the control command for opening a main cockpit door of the vehicle doors to the control module.

Specifically, the detected sliding trace is:

at a first time point, a combined position of the user and touch area is in a first position;

at a second time point after the first time point, the combined position of the user and touch area is in a second position;

at a time point between the first time point and the second time point, the combined position of the user and touch area changes to form a path;

wherein, an angle from a tangential direction of the first position of the path to a tangential direction of the second position of the path is not greater than 90 degrees.

The control command corresponding to the detected sliding trace is:

opening the main cockpit door of the vehicle doors.

For example, in FIG. 2, the detected sliding trace is the path R, the processing module transmits the control command for opening the cockpit door of the vehicle doors to the control module according to the detected action.

In a still another embodiment of the present disclosure, the step of transmitting the control command to the control module according to the detected action through the processing module includes the following step:

when the extending direction of the sliding trace is located between a 9 o'clock direction and a 0 o'clock direction of the touch area, the processing module transmits the control command for opening the main cockpit door of the vehicle doors to the control module;

when the extending direction of the sliding trace is located between a 0 o'clock direction and a 3 o'clock direction of the touch area, the processing module transmits the control command for opening a sub cockpit door of the vehicle doors to the control module;

when the extending direction of the sliding trace is located between a 3 o'clock direction and a 6 o'clock direction of the touch area, the processing module transmits the control command for opening a right cabin door of the vehicle doors to the control module;

when the extending direction of the sliding trace is located between a 6 o'clock direction and a 9 o'clock direction of the touch area, the processing module transmits the control command for opening a left cabin door of the vehicle doors to the control module.

Specifically, in FIG. 2, assuming the extending direction of the path R is located between the 9 o'clock direction and the 0 o'clock direction, the processing module transmits the control command for opening the main cockpit door of the vehicle doors to the control module according to the detected action. Assuming the extending direction of the path R is located between the 0 o'clock direction and the 3 o'clock direction, the processing module transmits the control command for opening the sub cockpit door of the vehicle doors to the control module according to the detected action. Assuming the extending direction of the path R is located between the 3 o'clock direction and the 6 o'clock direction, the processing module transmits the control command for opening the right cabin door of the vehicle doors to the control module according to the detected action. Assuming the extending direction of the path R is located between the 6 o'clock direction and the 9 o'clock direction, the processing module transmits the control command for opening the left cabin door of the vehicle doors to the control module according to the detected action.

In a still another embodiment of the present disclosure, the step of transmitting the control command to the control module according to the detected action through the processing module includes the following step:

when the path from the first position to the second position is a counterclockwise direction, the processing module transmits the control command for opening all the vehicle doors to the control module.

Specifically, the detected sliding trace is:

at a first time point, a combined position of the user and touch area is in a first position;

at a second time point after the first time point, the combined position of the user and touch area is in a second position;

at a time point between the first time point and the second time point, the combined position of the user and touch area changes to form a path;

wherein, an angle from a tangential direction of the first position of the path to a tangential direction of the second position of the path is not less than 180 degrees.

The control command corresponding to the detected sliding trace is:

opening the all the vehicle doors or closing all the vehicle doors.

Specifically, please refer to FIG. 3. The detected sliding trace is the path D, the processing module transmits the control command for opening all the vehicle doors to the control module according to the detected action. The detected sliding trace is the path I, the processing module transmits the control command for closing all the vehicle doors to the control module according to the detected action.

In a still another embodiment of the present disclosure, the step of transmitting the control command to the control module according the detected action through the processing module includes the following steps:

when the first position is in a first quadrant position of the touch area, or when the first position is in a second quadrant position of the touch area, or when the first position is in a third quadrant position of the touch area, or when the first position is in a fourth quadrant position of the touch area, the processing module transmits the control command for opening the main cockpit door of the vehicle doors to the control module.

Specifically, please refer to FIG. 4. When the position C of the touch area T is compressed by the pressure variation, the processing module transmits the control command for opening the main cockpit door of the vehicle doors to the control module. Of course, when the first position is located in the different quadrant of the touch area T, a corresponding control command may be set according to the specific case.

In a still another embodiment of the present disclosure, the step of transmitting the control command to the control module according the detected action through the processing module includes the following step:

when the first position is in the first quadrant position of the touch area, the processing module transmits the control command for opening the main cockpit door of the vehicle doors to the control module;

when the first position is in the second quadrant position of the touch area, the processing module transmits the control command for opening the sub cockpit door of the vehicle doors to the control module;

when the first position is in the third quadrant position of the touch area, the processing module transmits the control command for opening the right cabin door of the vehicle doors to the control module;

when the first position is in the fourth quadrant position of the touch area, the processing module transmits the control command for opening the left cabin door of the vehicle doors to the control module.

Specifically, please refer to FIG. 4. When a press position is set at the position C, the processing module transmits the control command for opening the main cockpit door of the vehicle doors to the control module. When a press position is set at the position K, the processing module transmits the control command for opening the sub cockpit door of the vehicle doors to the control module. When a press position is set at the position M, the processing module transmits the control command for opening the right cabin door of the vehicle doors to the control module. When a press position is set at the position N, the processing module transmits the control command for opening the left cabin door of the vehicle doors to the control module.

In a still another embodiment of the present disclosure, the step of transmitting the control command to the control module according the detected action through the processing module includes the following step:

when the trace from the first position through the second position to the third position is a counterclockwise direction, the processing module transmits the control command for opening all the vehicle doors to the control module.

In a still another embodiment of the present disclosure, the step of transmitting the control command to the control module according the detected action through the processing module includes the following step:

when the trace from the first position through the second position to the third position is a clockwise direction, the processing module transmits the control command for closing all the vehicle doors to the control module.

Specifically, please refer to FIG. 4. The position C, the position K and the position M may be set to be pressed in turn to transmit the control command for closing all the vehicle doors. The position C, the position N and the position M may be set to be pressed in turn to transmit the control command for opening all the vehicle doors.

S300: performing the control command to select at least one vehicle door from all vehicle doors and operate the selected vehicle door through the control module.

In a still another embodiment of the present disclosure, the step of performing the control command to select at least one vehicle door from all vehicle doors and operate the selected vehicle door through the control module includes the following step:

performing the control command to select all vehicle doors pointed by the control command through the control module; and operating the selected vehicle door through the control module.

The control module operates the selected vehicle door, so as to ensure the consistency of the vehicle door intended to operate and the operated vehicle door, thereby avoiding the invalid operation and increasing the convenience of the operation for the user.

Specifically, for example, the control command requests to open the main cockpit door and the sub cockpit door. The control module performs the control command to directly open the main cockpit door and the sub cockpit door. Or, the control command requests to open all the vehicle doors. The control module performs the control command to directly open all the vehicle doors.

In a still another embodiment of the present disclosure, the step of performing the control command to select at least one vehicle door from all vehicle doors and operate the selected vehicle door through the control module includes the following step:

the control module includes a first control subsystem and a second control subsystem;

the step of performing the control command to select at least one vehicle door from all vehicle doors and operate the selected vehicle door through the control module includes the following step:

performing the control command to operate a main cockpit door through the first control subsystem;

determining whether an object pointed by the control command includes other doors besides the main cockpit door through the first control subsystem;

transmitting the control command to the second subsystem through the first control subsystem when the object pointed by the control command includes other doors besides the main cockpit door;

determining whether the control command points a vehicle door controlled by the second control subsystem through the second control subsystem; and operating the vehicle door through the second control subsystem when the control command points the second control subsystem.

Generally, in a case that only the driver is in the vehicle, the first control subsystem may achieve opening the main cockpit door, and the second control subsystem may be in a non-work state, thereby saving the energy consumption. In a case that other passengers are in the vehicle, the first control subsystem transmits the control command to the second control subsystem and triggers the second control subsystem to work, thereby achieving the control of the other vehicle doors and increasing the convenience for the user.

Specifically, for example, the control module includes a main cockpit control subsystem and a sub cockpit control subsystem. The main cockpit control subsystem may perform the control command to operate the main cockpit door. At the same time, the main cockpit control subsystem manages and controls the sub cockpit control subsystem. The main cockpit control subsystem determines whether an object pointed by the control command includes the sub cockpit door. When the object pointed by the control command includes the sub cockpit door, the main cockpit control subsystem transmits the control command to the sub cockpit control subsystem. It should be noted that the description is illustrated by the case of the sub cockpit control subsystem serving as the second control subsystem. Of course, a right cabin control subsystem, a left cabin control subsystem and a trunk control subsystem may also be the second control subsystem herein.

In the embodiment of the present disclosure, the processing module transmits the control command to the control module according to the detected action; the control module performs the control command to select at least one vehicle door from all the vehicle doors and operate the selected vehicle door, thereby increasing the convenience for operating the vehicle door. The present disclosure not only achieves entering the vehicle without the key for the driver, but also enables the driver to remotely control the functions for opening or closing the other doors at the side of the door near himself/herself.

Figure 5:
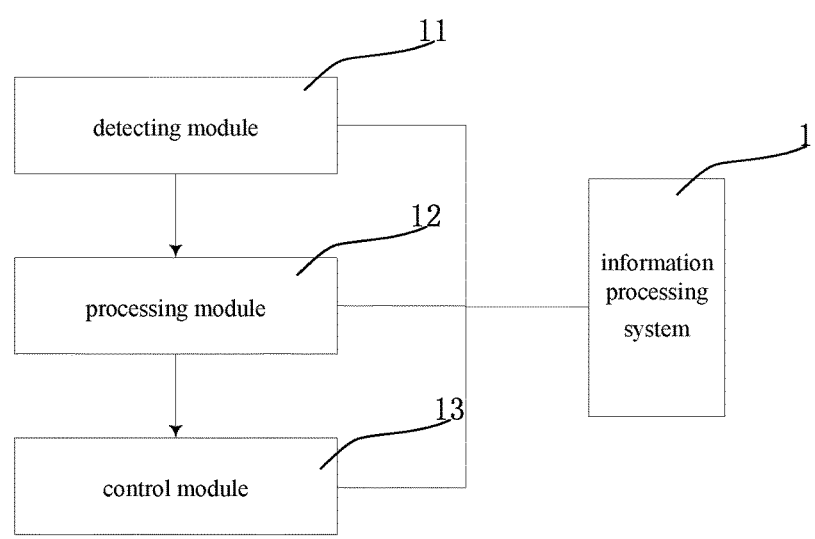
FIG. 5 is a schematic view of an information proceeding system according to one embodiment of the present disclosure.

The information processing method provided by the embodiment of the present disclosure is described as above, and based on the same idea, please refer to FIG. 5, the present disclosure further provides an information processing system 1, which includes:

a detecting module 11, for detecting an action of a vehicle door controlled by an user, and feedbacking the action to a processing module;

a processing module 12, for transmitting a control command to a control module according to the detected action; and a control module 13, for performing the control command to select at least one vehicle door from all vehicle doors and operate the selected vehicle door.

In a still another embodiment of the present disclosure, the detecting module 11 includes a touch component equipped with a touch area;

the detecting module 11 for detecting the action of the vehicle door controlled by the user, and feedbacking the action to the processing module 12 is specifically used for:

the touch component detecting a sliding trace of the user on the touch area.

The sliding trace is:

at a first time point, a combined position of the user and touch area is in a first position;

at a second time point after the first time point, the combined position of the user and touch area is in a second position;

at a time point between the first time point and the second time point, the combined position of the user and touch area changes to form a path;

wherein, an angle from a tangential direction of the first position of the path to a tangential direction of the second position of the path is not greater than 90 degrees.

In a still another embodiment of the present disclosure, the processing module 12 for transmitting the control command to the control module 13 according to the detected action is specifically used for:

when an extending direction of the sliding trace is located between a 9 o'clock direction and a 0 o'clock direction of the touch area, or when an extending direction of the sliding trace is located between a 0 o'clock direction and a 3 o'clock direction of the touch area, or when an extending direction of the sliding trace is located between a 3 o'clock direction and a 6 o'clock direction of the touch area, or when an extending direction of the sliding trace is located between a 6 o'clock direction and a 9 o'clock direction of the touch area, the processing module transmits 12 the control command for opening a main cockpit door of the vehicle doors to the control module 13.

In a still another embodiment of the present disclosure, the processing module 12 for transmitting the control command to the control module 13 according to the detected action is specifically used for:

when the extending direction of the sliding trace is located between a 9 o'clock direction and a 0 o'clock direction of the touch area, the processing module 12 transmits the control command for opening the main cockpit door of the vehicle doors to the control module 13;

when the extending direction of the sliding trace is located between a 0 o'clock direction and a 3 o'clock direction of the touch area, the processing module 12 transmits the control command for opening a sub cockpit door of the vehicle doors to the control module 13;

when the extending direction of the sliding trace is located between a 3 o'clock direction and a 6 o'clock direction of the touch area, the processing module 12 transmits the control command for opening a right cabin door of the vehicle doors to the control module 13;

when the extending direction of the sliding trace is located between a 6 o'clock direction and a 9 o'clock direction of the touch area, the processing module 12 transmits the control command for opening a left cabin door of the vehicle doors to the control module 13.

Further, in a still another embodiment of the present disclosure, the sliding trace is:

at a first time point, a combined position of the user and touch area is in a first position;

at a second time point after the first time point, the combined position of the user and touch area is in a second position;

at a time point between the first time point and the second time point, the combined position of the user and touch area changes to form a path;

wherein, an angle from a tangential direction of the first position of the path to a tangential direction of the second position of the path is not less than 180 degrees.

In a still another embodiment of the present disclosure, the processing module 12 for transmitting the control command to the control module 13 according to the detected action is specifically used for:

when the path from the first position to the second position is a counterclockwise direction, the processing module 12 transmits the control command for opening all the vehicle doors to the control module 13.

In a still another embodiment of the present disclosure, the processing module 12 for transmitting the control command to the control module 13 according to the detected action is specifically used for:

when the path from the first position to the second position is a clockwise direction, the processing module 12 transmits the control command for closing all the vehicle doors to the control module 13.

In a still another embodiment of the present disclosure, the detecting module 11 includes a touch component equipped with a touch area;

the detecting module 11 for detecting the action of the vehicle door controlled by the user, and feedbacking the action to the processing module 12 is specifically used for:

the touch component detects a press operation of the user on the touch area.

In a still another embodiment of the present disclosure, the press operation is:

a first position of the touch area is compressed by a pressure variation.

In a still another embodiment of the present disclosure, the processing module 12 for transmitting the control command to the control module 13 according to the detected action is specifically used for:

when the first position is in a first quadrant position of the touch area, or when the first position is in a second quadrant position of the touch area, or when the first position is in a third quadrant position of the touch area, or when the first position is in a fourth quadrant position of the touch area, the processing module 12 transmits the control command for opening the main cockpit door of the vehicle doors to the control module 13.

In a still another embodiment of the present disclosure, the processing module 12 for transmitting the control command to the control module 13 according to the detected action is specifically used for:

when the first position is in the first quadrant position of the touch area, the processing module 12 transmits the control command for opening the main cockpit door of the vehicle doors to the control module 13;

when the first position is in the second quadrant position of the touch area, the processing module 12 transmits the control command for opening the sub cockpit door of the vehicle doors to the control module 13;

when the first position is in the third quadrant position of the touch area, the processing module 12 transmits the control command for opening the right cabin door of the vehicle doors to the control module 13;

when the first position is in the fourth quadrant position of the touch area, the processing module 12 transmits the control command for opening the left cabin door of the vehicle doors to the control module 13.

In a still another embodiment of the present disclosure, the press operation is:

a first position, a second position and a third position of the touch area are compressed by a pressure variation;

wherein, a trace from the first position through the second position to the third position, relative to a center of the touch area, is distributed within a range not less than 180 degrees.

In a still another embodiment of the present disclosure, the processing module 12 for transmitting the control command to the control module 13 according to the detected action is specifically used for:

when the trace from the first position through the second position to the third position is a counterclockwise direction, the processing module 12 transmits the control command for opening all the vehicle doors to the control module 13.

In a still another embodiment of the present disclosure, the processing module 12 for transmitting the control command to the control module 13 according to the detected action is specifically used for:

when the trace from the first position through the second position to the third position is a clockwise direction, the processing module 12 transmits the control command for closing all the vehicle doors to the control module 13.

In a still another embodiment of the present disclosure, the detecting module 11 includes a lens assembly;

the detecting module 11 for detecting the action of the vehicle door controlled by the user, and feedbacking the action to the processing module 12 is specifically used for:

detecting the action of the vehicle door controlled by the user.

Further, in a still another embodiment of the present disclosure, the detecting module 11 is further used for:

collecting an user identity and feedbacking the user identity to the processing module 12;

the processing module 12 is further used for:

comparing the collected user identity with a predetermined user identity;

when the collected user identity is consistent with the predetermined user identity, transmitting a control command for unlocking all vehicle doors to the control module 13;

the control module 13 is further used for:

performing the control command for unlocking all vehicle doors to unlock all vehicle doors through the control module.

Specifically, the user operates the detecting module 11. The detecting module 11 may be a touch screen. The detecting module 11 collects an user identity, such as a fingerprint. The detecting module 11 feedbacks the collected user identity to the processing module 12. The processing module 12 compares the collected user identity with a predetermined user identity, for example, determines whether the fingerprint of the user is consistent with the predetermined fingerprint of the user. When the collected user identity is consistent with the predetermined user identity, the processing module 12 transmits a control command for unlocking all vehicle doors to the control module 13. The control module 13 performs the control command to unlock all vehicle doors.

In an embodiment provided by the present disclosure, an information processing system includes:

a touch screen, for:

collecting an identity of an user and detecting an action of a vehicle door controlled by the user, and feedbacking the identity of the user and the action of the vehicle door controlled by the user to a processor;

the processor, for:

transmitting a control command to a control system according to the identity of the user and the action of the vehicle door controlled by the user;

the control system, for:

operating the vehicle door according to the control command.

Specifically, the screen may be an ordinary capacitive or resistive touch display. The processor may be a processor with a small and medium-sized calculating function, such as a microprocessor, a microcontroller, etc. The control system may include, but is not limited to, a signal receiver, a signal line, a motor; specifically, the control system may include the signal receiver, the signal line and the motor connected to the signal receiver through the signal line.

The touch screen collects the user identity and compares the user identity with a predetermined identity or a pre-authorization identity. When the collected user identity is consistent with the predetermined identity or the pre-authorization identity, the touch screen feedbacks information to the processor. The processor processes the fedback information to transmit a control command for unlocking all the vehicle doors. The control system performs the control command to unlock all the vehicle doors. The touch screen may simultaneously detect the action of the vehicle door controlled by the user and feedback the action to the processor. The processor processes the fedback information including the action of the vehicle door controlled by the user, so as to transmit the control command for operating at least one vehicle door to the control module. The control module performs the control command to select at least one vehicle door and operate the selected door.

In an embodiment of the present disclosure, for the vehicle only including a main cockpit and a sub cockpit, the control system includes a main cockpit control subsystem and a sub cockpit control subsystem or a trunk control subsystem.

The main cockpit control subsystem is used for:

operating a main cockpit door according to the control command;

determining whether an object pointed by the control command includes a sub cockpit door or a trunk door;

transmitting the control command to the sub cockpit control subsystem or the trunk control subsystem through the main cockpit control subsystem when object pointed by the control command includes the sub cockpit door or the trunk door;

the sub cockpit control subsystem is used for:

operating the sub cockpit door according to the control command;

the trunk control subsystem, for:

operating the trunk door according to the control command.

For example, for the vehicle only includes a main cockpit and a sub cockpit, the control system includes a main cockpit control subsystem and a sub cockpit control subsystem; or the control system includes a main cockpit control subsystem and a sub cockpit control subsystem or a trunk control subsystem. When the control command points to the main cockpit door, the main cockpit control subsystem operates the main cockpit door. When the control command points to the sub cockpit door or when the control command points to the trunk door, the main cockpit control subsystem transmits the control command to the sub cockpit control subsystem. After the sub cockpit control subsystem receives the control command, the sub cockpit control subsystem determines whether the control command points to the sub cockpit door. When the control command points to the sub cockpit door, the sub cockpit control subsystem performs the control command to operate the sub cockpit door. After the trunk control subsystem receives the control command, the trunk control subsystem determines whether the control command points to the trunk door. When the control command points to the trunk door, the trunk control subsystem performs the control command to operate the trunk door.

Further, in an embodiment of the present disclosure, the control system includes a right cabin control subsystem and a left cabin control subsystem;

wherein, a main cockpit control subsystem is used for:

operating a main cockpit door according to the control command;

determining whether an object pointed by the control command includes a right cabin door or a left cabin door;

transmitting the control command respectively to the right cabin control subsystem or the left cabin control subsystem through the main cockpit control subsystem when object pointed by the control command includes the right cabin door or the left cabin door;

the right cabin control subsystem, for:

operating the right cabin door according to the control command;

the left cabin control subsystem, for:

operating the left cabin door according to the control command.

In the embodiment, for the vehicle only including a right cabin door and a left cabin door, the control system includes a right cabin control subsystem and a left cabin control subsystem. The function of the right cabin control subsystem and the left cabin control subsystem is similar to the sub cockpit control subsystem described above, and thus the description is omitted.

Further, the touch screen is configured on a pillar of the vehicle or the touch screen is configured on a front windshield or a back windshield of the vehicle.

The touch screen configured on these positions may conveniently control the vehicle door for user.

A specific application scene of the embodiment of the present disclosure is described as follows.

The user touches the touch screen served as the detecting module and located at a position near the vehicle door. The position may be the front windshield or the back windshield of the vehicle, and may also be a pillar B between the main cockpit door and the left cabin door of the vehicle, or a pillar B between the sub cockpit door and the right cabin door of the vehicle.

The touch screen detects the action of the vehicle door controlled by the user through the manner for collecting the fingerprint information and gesture track information, and feedbacks the action to the processor served as the processing module. The processor compares the collected fingerprint information with a predetermined owner fingerprint to determine whether the user is the owner. When the user is not the owner, the processor omits the action of the touch screen touched by the user, and transmits a prompt. The transmitted prompt may be a flicker on the touch screen to prompt the authentication failure of the identity. Otherwise, when the processor compares the collected fingerprint information with the predetermined owner fingerprint and determines the collected fingerprint information is consistent with the predetermined owner fingerprint, the processor transmits the unlock command for unlocking all the vehicle doors to the control module. After the control module receives the unlock command, the control module releases the lock state of all the vehicle doors.

At the same time for transmitting the unlock command by the processor or within the later predetermined time, the processor may transmits the control command to the control module according to the sliding trace of the fingerprint. A corresponding relationship is included between the sliding trace and the control command. The specific sliding trace and the corresponding relationship included between the sliding trace and the control command may be set according to the practical case. For example, when the extending direction of the sliding trace is located between a 9 o'clock direction and a 0 o'clock direction of the touch area, the sliding trace may correspond to the control command for opening the main cockpit door. When the extending direction of the sliding trace of the finger of the user is located between a 9 o'clock direction and a 0 o'clock direction of the touch area, the processing module transmits the control command for opening the main cockpit door to the control module. The control module performs the control command for opening the main cockpit door to open the main cockpit door. As another example, when the sliding track is a counterclockwise circular greater than 270 degrees, it may correspond to a control command for opening all the vehicle doors. When the sliding trace of the finger is counterclockwise circular greater than 270 degrees, the processor transmits the control command for opening all the vehicle doors to the control module. The control module performs the control command for opening all the vehicle doors to open all the vehicle doors.

The control module may include a first control subsystem for controlling the main cockpit door and a second control subsystem for controlling other vehicle door. Specifically, the first control subsystem and the second control subsystem may be composed of a signal receiver, a signal line, a motor, etc, which are used for receiving the control command transmitted by the processor and controlling the motor to close, open, lock and unlock the vehicle door according to the control command. A relationship may control and may be controlled between the first control subsystem and the second control subsystem. The first control subsystem and the second control subsystem are communicated through a controller area network (CAN). For example, the first control subsystem transmits the data 0x07 with 1 byte, such as the number 7 of the hexadecimal, to the second control subsystem.

The data are consistent with the following format:

| ID | DLC | Bit 7 | Bit 6 | Bit 5 | Bit 4 | Bit 3 | Bit 2 | Bit 1 | Bit 0 |
|---|---|---|---|---|---|---|---|---|---|
| Predefined | 1 Byte | Reserved | Reserved | Reserved | Reserved | Reserved | Sub cockpit | Left cabin | Right cabin |

Wherein, the CAN communication signal satisfies the data link control (DLC) protocol, a length of the communication signal is 1 byte. Bit0 indicates an end number of the binary. The number is 0 or 1 may represent different operations for the right cabin door, for example, 0 may indicates closing the door, 1 may indicates opening the door. Bit1 indicates a penultimate number of the binary, and the number may represent different operations for the left cabin door. Similarly, Bit2 is similar. Bit3 to Bit7 indicate that the numbers of fourth from the last to first are in a reserved state.

The data 0x07 indicates that Bit2 is 1, Bit1 is 1 and Bit0 is 1, that is, in addition to open the main cockpit door, the other doors are also opened. After the second control subsystem receives the data, the second control subsystem analyzes the data and determines the control command points to the vehicle door controlled by the second control subsystem. The second control subsystem for controlling the sub cockpit door controls the motor to open the sub cockpit door. Similarly, the left cabin door and the right cabin door are opened under the same control of the second control subsystem. Of course, when Bit0 is 0, the control command does not point to the right cabin door, such that the right cabin door does not open.

When the sliding trace is a clockwise circular greater than 270 degrees, the sliding trace may correspond to the control command for locking all the doors. Similar to the above case of opening all the doors, the processing module transmits the control command for locking all the doors to the control module. The control module performs the control command to lock all the doors.

Figure 6:
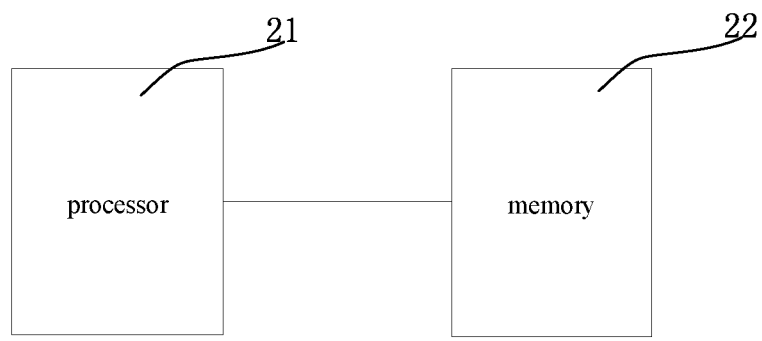
FIG. 6 is a schematic view of an apparatus used for controlling a vehicle door according to one embodiment of the present disclosure.

FIG. 6 is a schematic view of an apparatus used for controlling a vehicle door according to one embodiment of the present disclosure. The information processing apparatus used for controlling the vehicle door includes:

a processor 21; and a memory 22 containing a program, when executed by the processor, the processor executes the following steps:

detecting an action of a vehicle door controlled by an user and feedbacking the action to a processing module through a detecting module;

transmitting a control command to a control module according to the detected action through the processing module; and performing the control command to select at least one vehicle door from all vehicle doors and operate the selected vehicle door through the control module.

In the embodiment of the present disclosure, the processor served as the processing module transmits the control command to the control system served as the control module according to the detected action; the control system performs the control command to operate the vehicle door, thereby increasing the convenience for operating the vehicle door. The present disclosure not only achieves the driver entering the vehicle without the key, but also enables the driver to remotely control the functions for opening or closing the other doors at a side of the door near himself/herself.

The above descriptions are only embodiments of the present disclosure, but not to limit the present disclosure.

For the skilled in the art, the present disclosure may have a variety of modifications and changes. Any modification, the equivalent replacement, or the improvement made within the spirit and principle of the present disclosure should be included within the scope of the claims of the present disclosure.

What is claimed is:

1. An information processing method, used for controlling a vehicle door, the information processing method comprising:

detecting an action of a vehicle door controlled by a user and feedbacking the action to a processing module through a detecting module, wherein:
  the detecting module comprises a touch component equipped with a touch area,
  the detecting an action of a vehicle door controlled by the user and feedbacking the action to the processing module through the detecting module comprises detecting a sliding trace of the user on the touch area through the touch component, and
  the sliding trace is, at a first time point, a combined position of the user and touch area is at a first position and, at a second time point after the first time point, the combined position of the user and touch area is at a second position;

transmitting a control command to a control module according to the detected action through the processing module; and performing the control command to select at least one vehicle door from all vehicle doors and operate the selected vehicle door through the control module.

2. The information processing method according to claim 1, wherein the sliding trace is at a time point between the first time point and the second time point, the combined position of the user and touch area changes to form a path, wherein, an angle from a tangential direction of the first position of the path to a tangential direction of the second position of the path is not greater than 90 degrees.

3. The information processing method according to claim 2, wherein the step of transmitting a control command to a control module according to the detected action through the processing module comprises the processing module to transmit the control command for opening a main cockpit door of at least one vehicle door to the control module when:

the extending direction of the sliding trace is located between a 9 o'clock direction and a 0 o'clock direction of the touch area, the extending direction of the sliding trace is located between a 0 o'clock direction and a 3 o'clock direction of the touch area, the extending direction of the sliding trace is located between a 3 o'clock direction and a 6 o'clock direction of the touch area, the extending direction of the sliding trace is located between a 6 o'clock direction and a 9 o'clock direction of the touch area.

4. The information processing method according to claim 2, wherein the step of transmitting a control command to a control module according to the detected action through the processing module comprises the following step:

when the extending direction of the sliding trace is located between a 9 o'clock direction and a 0 o'clock direction of the touch area, the processing module transmits the control command for opening a main cockpit door of the vehicle doors to the control module;

when the extending direction of the sliding trace is located between a 0 o'clock direction and a 3 o'clock direction of the touch area, the processing module transmits the control command for opening a sub cockpit door of the vehicle doors to the control module;

when the extending direction of the sliding trace is located between a 3 o'clock direction and a 6 o'clock direction of the touch area, the processing module transmits the control command for opening a right cabin door of the vehicle doors to the control module; and when the extending direction of the sliding trace is located between a 6 o'clock direction and a 9 o'clock direction of the touch area, the processing module transmits the control command for opening a left cabin door of the vehicle doors to the control module.

5. The information processing method according to claim 1, wherein the sliding trace is at a time point between the first time point and the second time point, the combined position of the user and touch area changes to form a path, wherein, an angle from a tangential direction of the first position of the path to a tangential direction of the second position of the path is not less than 180 degrees.

6. The information processing method according to claim 5, wherein the step of transmitting the control command to the control module according to the detected action through the processing module comprises the following step:

when the path from the first position to the second position is a counterclockwise direction, the processing module transmits the control command for opening all the vehicle doors to the control module.

7. The information processing method according to claim 5, wherein the step of transmitting the control command to the control module according to the detected action through the processing module comprises the following step:

when the path from the first position to the second position is a clockwise direction, the processing module transmits the control command for closing all the vehicle doors to the control module.

8. The information processing method according to claim 1, wherein the detecting module further comprises a touch component equipped with a touch area;

and wherein detecting the action of the vehicle door controlled by the user and feedbacking the action to the processing module through the detecting module comprises detecting a press operation of the user on the touch area through the touch component.

9. The information processing method according to claim 8, wherein the press operation is a first position of the touch area compressed by a pressure variation.

10. The information processing method according to claim 9, wherein the step of transmitting the control command to the control module according the detected action through the processing module further comprises:

when the first position is in a first quadrant position of the touch area, or when the first position is in a second quadrant position of the touch area, or when the first position is in a third quadrant position of the touch area, or when the first position is in a fourth quadrant position of the touch area, the processing module transmits the control command for opening the main cockpit door of the vehicle doors to the control module.

11. The information processing method according to claim 9, wherein the step of transmitting the control command to the control module according the detected action through the processing module further comprises:

when the first position is in a first quadrant position of the touch area, the processing module transmits the control command for opening the main cockpit door of the vehicle doors to the control module;

when the first position is in a second quadrant position of the touch area, the processing module transmits the control command for opening the sub cockpit door of the vehicle doors to the control module, when the first position is in a third quadrant position of the touch area, the processing module transmits the control command for opening the right cabin door of the vehicle doors to the control module; and when the first position is in the fourth quadrant position of the touch area, the processing module transmits the control command for opening the left cabin door of the vehicle doors to the control module.

12. The information processing method according to claim 8, wherein the press operation is:

a first position, a second position and a third position of the touch area are compressed by a pressure variation;

wherein, a trace from the first position through the second position to the third position, relative to a center of the touch area, is distributed within a range not less than 180 degrees.

13. The information processing method according to claim 12, wherein the step of transmitting the control command to the control module according the detected action through the processing module comprises the following step:

when the trace from the first position through the second position to the third position is a counterclockwise direction, the processing module transmits the control command for opening all the vehicle doors to the control module.

14. The information processing method according to claim 12, wherein the step of transmitting the control command to the control module according the detected action through the processing module comprises the following step:

when the trace from the first position through the second position to the third position is a clockwise direction, the processing module transmits the control command for closing all the vehicle doors to the control module.

15. The information processing method according to claim 1, wherein the detecting module comprises a lens assembly;

the step of detecting the action of the vehicle door controlled by the user and feedbacking the action to the processing module through the detecting module includes the following step:

detecting the action of the vehicle door controlled by the user through the lens assembly.

16. An apparatus, used for controlling a vehicle door, the apparatus comprising:

a processor; and a memory containing a program, when executed by the processor, the processor executes the following steps:

detecting an action of a vehicle door controlled by a user and feedbacking the action to a processing module through a detecting module through a detecting module comprising a touch component equipped with a touch area, wherein:

the detecting of an action of a vehicle door controlled by a user and feedbacking the action to the processing module through the detecting module comprises detecting a sliding trace of the user on the touch area through the touch component, and the sliding trace is, at a first time point, a combined position of the user and touch area is at a first position and, at a second time point after the first time point, the combined position of the user and touch area is at a second position;

transmitting a control command to a control module according to the detected action through the processing module; and performing the control command to select at least one vehicle door from all vehicle doors and operate the selected vehicle door through the control module.

17. The apparatus according to claim 16, wherein the sliding trace is at a time point between the first time point and the second time point, the combined position of the user and touch area changes to form a path, wherein, an angle from a tangential direction of the first position of the path to a tangential direction of the second position of the path is not greater than 90 degrees.

18. The apparatus according to claim 17, wherein the processing module for transmitting the control command to the control module according to the detected action causes the processing module transmit the control command for opening a main cockpit door of the vehicle door to the control module when:

an extending direction of the sliding trace is located between a 9 o'clock direction and a 0 o'clock direction of the touch area, an extending direction of the sliding trace is located between a 0 o'clock direction and a 3 o'clock direction of the touch area, an extending direction of the sliding trace is located between a 3 o'clock direction and a 6 o'clock direction of the touch area, or an extending direction of the sliding trace is located between a 6 o'clock direction and a 9 o'clock direction of the touch area.

* * * * *